United States Patent
Reed et al.

(10) Patent No.: US 12,092,200 B1
(45) Date of Patent: Sep. 17, 2024

(54) LUBRICATION OF A PLANETARY GEAR SYSTEM

(71) Applicant: Allison Transmission, Inc., Indianapolis, IN (US)

(72) Inventors: William Scott Reed, Greenfield, IN (US); Isaac Mock, Martinsville, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 0 days.

(21) Appl. No.: 18/237,024

(22) Filed: Aug. 23, 2023

(51) Int. Cl.
*F16H 57/04* (2010.01)
*F16H 1/28* (2006.01)
*F16H 57/08* (2006.01)

(52) U.S. Cl.
CPC ........... *F16H 57/0431* (2013.01); *F16H 1/28* (2013.01); *F16H 57/0486* (2013.01); *F16H 57/082* (2013.01)

(58) Field of Classification Search
CPC .... F16H 57/0431; F16H 1/28; F16H 57/0486; F16H 57/082; F16H 57/0482; F16H 57/0479
See application file for complete search history.

(56) References Cited

U.S. PATENT DOCUMENTS

| | | | |
|---|---|---|---|
| 3,776,067 A | 12/1973 | DeBruyne | |
| 3,960,029 A * | 6/1976 | Eichinger | F16H 57/0456 184/6.12 |
| 4,271,928 A * | 6/1981 | Northern | B64C 27/12 184/6.12 |
| 5,472,383 A | 12/1995 | McKibbin | |
| 5,567,056 A * | 10/1996 | Blase | F16C 33/1055 384/380 |
| 5,928,100 A * | 7/1999 | Ohtake | F16H 57/0482 475/159 |
| 8,636,615 B2 * | 1/2014 | Suzuki | B23P 19/04 475/159 |
| 8,667,688 B2 * | 3/2014 | McCune | F16H 57/023 475/159 |
| 8,840,508 B2 * | 9/2014 | Floren | F16H 57/0456 184/6.12 |
| 9,038,779 B2 * | 5/2015 | McCune | F16H 57/0423 184/6.11 |
| 9,416,866 B2 | 8/2016 | Konruff et al. | |

(Continued)

FOREIGN PATENT DOCUMENTS

| | | | |
|---|---|---|---|
| EP | 0164968 A1 * | 12/1985 | |
| EP | 1717489 A2 * | 11/2006 | ............ F03D 80/70 |
| WO | WO-2016011126 A1 * | 1/2016 | ......... F16H 57/0409 |

*Primary Examiner* — Sherry L Estremsky
(74) *Attorney, Agent, or Firm* — Faegre Drinker Biddle Reath LLP

(57) ABSTRACT

A planetary system, which may be found in an automotive transmission, is provided. The planetary system may include a sun gear, a plurality of pinion gears that are operably coupled to the sun gear and carried by a carrier, and a ring gear operably coupled to the plurality of pinion gears. The carrier may include a plurality of spaced apart side walls and a plurality of circumferentially spaced apart posts that interconnect the side walls. The plurality of posts and side walls may be unitary with one another. Further, at least one of the posts may include an oil delivery channel and an oil exit channel in fluid communication with one another.

15 Claims, 7 Drawing Sheets

(56) References Cited

U.S. PATENT DOCUMENTS

| | | |
|---|---|---|
| 11,208,957 B2 | 12/2021 | Desjardins et al. |
| 11,396,940 B2 | 7/2022 | Di Giovanni et al. |
| 11,396,941 B2 | 7/2022 | Pennacino et al. |
| 11,428,310 B2 * | 8/2022 | Briceno ............... F16H 57/082 |
| 11,448,310 B2 | 9/2022 | Sheridan et al. |
| 2003/0232694 A1 * | 12/2003 | Buhrke .............. F16H 57/0427 |
| | | 475/346 |
| 2011/0140448 A1 * | 6/2011 | Takeuchi ........... F16C 33/1055 |
| | | 290/55 |
| 2016/0153545 A1 | 6/2016 | Kucukyavuz et al. |
| 2022/0252009 A1 | 8/2022 | Polly |

* cited by examiner

LUBRICATION OF A PLANETARY GEAR SYSTEM

TECHNICAL FIELD

The present application relates generally to planetary gear systems, such as planetary gear systems of vehicle transmissions. More specifically, the present application relates to lubricating gears of planetary gears systems.

BACKGROUND

Planetary gear systems may be used in a variety of contexts. In some examples, a planetary gear system may be used in vehicle transmissions, such as to offer multiple gear ratios, reverse capabilities, and/or efficient torque distribution. Generally, a planetary gear system includes a sun gear, a plurality of pinion gears supported by a carrier, and a ring gear. The plurality of pinion gears in a simple planetary gearset are intermeshed with the sun gear and the ring gear. The plurality of pinion gears may generate friction when engaged with the sun gear, thereby generating heat and negatively affecting a lifetime of the planetary gear system.

SUMMARY

Aspects of the present disclosure relate generally to a planetary gear system, such as a planetary system for an automotive transmission. Generally, a planetary gear system includes a sun gear, a plurality of pinion gears supported by a carrier, and a ring gear. The plurality of pinion gears in a simple planetary gearset are intermeshed with the sun gear and the ring gear. The plurality of pinion gears may generate friction when engaged with the sun gear and the ring gear, thereby generating heat and negatively affecting a lifetime of the planetary gear system. The carrier provided herein may include one or more oil passageways which direct oil onto the pinion gears. The carrier provided herein may include a plurality of spaced apart side walls and a plurality of circumferentially spaced apart posts that interconnect the side walls. At least one of the posts may include an oil delivery channel and an oil exit channel in fluid communication with one another. The oil exit channel may be pointed at a pinion gear, such that when oil is supplied to the carrier, the oil is delivered through the oil exit channel and onto the pinion gear. Accordingly, when the pinion gear meshes with the sun gear, the sun gear is lubricated with the oil to provide continuous oil cooling of the sun gear. The planetary gear system provided herein, which may provide continuous oil cooling of the sun gear, enables increased torque at higher speeds than conventional planetary gear systems.

In some examples a planetary system is provided. The planetary system includes a sun gear rotatable about an axis, a plurality of pinion gears operably coupled to the sun gear, a carrier, and a ring gear. The plurality of pinion gears include a pinion gear, and each of the plurality of pinion gears are rotatable relative to the sun gear. The carrier supports the plurality of pinion gears. The carrier includes a front wall, a rear wall spaced apart from the front wall, and a plurality of circumferentially spaced apart posts interconnecting the front wall and the rear wall. At least one of the posts includes an oil delivery channel and an oil exit channel in fluid communication with one another. The oil exit channel is pointed at a portion of the pinion gear that is about halfway along an axial length of the pinion gear. The ring gear is operably coupled to the plurality of pinion gears. The plurality of pinion gears are rotatable relative to the ring gear.

In some examples, each of the posts include a respective oil delivery channel and oil exit channel.

In some examples, the oil delivery channel extends through the carrier in a direction generally along the axis.

In some examples, the oil delivery channel extends non-parallel to the axis.

In some examples, the oil exit channel extends substantially orthogonal through the post with respect to the oil delivery channel.

In some examples, the carrier includes an inner circumferential surface and an outer circumferential surface, wherein the carrier includes a circumferential groove that extends through the inner circumferential surface, and wherein the groove intersects the oil delivery channel.

In some examples, the oil exit channel is pointed at a side of the pinion gear that is immediately rotating toward the sun gear.

In some examples, a method of lubricating a planetary system is provided. The method includes providing a carrier that includes a front wall, a rear wall spaced apart from the front wall, and a plurality of circumferentially spaced apart posts interconnecting the front wall and the rear wall, wherein at least one of the posts comprises an oil exit channel pointed at a pinion gear. The method further includes supplying oil to the carrier, such that the oil is delivered through the oil exit channel onto a side of the pinion gear that is immediately rotating into a sun gear, and meshing the pinion gear with the sun gear to lubricate the sun gear with the oil.

In some examples, the plurality of posts, the front wall, and the rear wall are unitary with one another.

In some examples, the at least one of the posts further includes an oil delivery channel in fluid communication with the oil exit channel, and wherein the supplying oil further includes supplying oil through the oil delivery channel, into the oil exit channel, and onto the pinion gear.

In some examples, the carrier is rotationally symmetric about an axis, and the oil delivery channel extends through the carrier in a direction generally along the axis.

In some examples, the oil is carried through the oil delivery channel by a rotation of the carrier.

In some examples, the oil delivery channel extends non-parallel to the axis.

In some examples, the oil exit channel extends substantially orthogonal through the post with respect to the oil delivery channel.

In some examples, the oil exit channel is pointed at a portion of the pinion gear that is about halfway along an axial length of the pinion gear.

In some examples, a carrier for a planetary gear system is provided. The carrier includes a plurality of spaced apart side walls, and a plurality of circumferentially spaced apart posts interconnecting the side walls. The plurality of posts and side walls are a unitary casting. At least one of the posts includes an oil delivery channel and an oil exit channel in fluid communication with one another.

In some examples, each of the posts include a respective oil delivery channel and oil exit channel.

In some examples, the carrier is rotationally symmetric about an axis, and the oil delivery channel extends through the carrier in a direction generally along the axis.

In some examples, the oil delivery channel extends non-parallel to the axis.

In some examples, the oil exit channel extends substantially orthogonal through the post with respect to the oil delivery channel.

This summary is provided to introduce a selection of concepts in a simplified form that are further described below in the Detailed Description. This summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTION OF THE DRAWINGS

The above mentioned and other features of this invention, and the manner of attaining them, will become more apparent and the invention itself will be better understood by reference to the following description of embodiments of the invention taken in conjunction with the accompanying drawings, where.

Corresponding reference characters may indicate corresponding parts throughout the several views. Unless stated otherwise the drawings are proportional and drawn to scale.

DETAILED DESCRIPTION OF THE DRAWINGS

Figure 1:
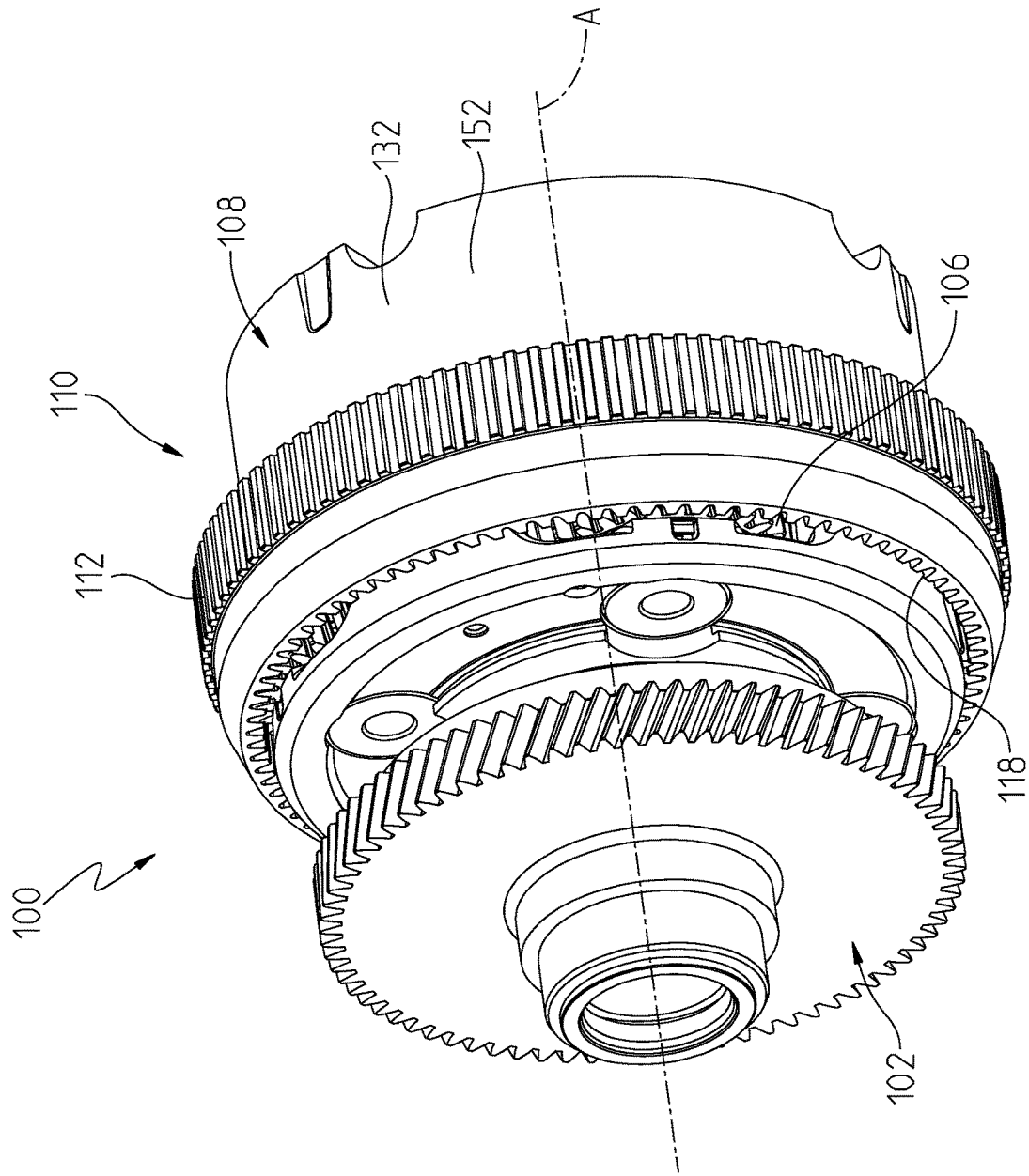
FIG. 1 illustrates an isometric view of a planetary gear system, according to some aspects provided herein.

It is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

While the structures and components disclosed herein may be embodied in many different forms, several specific embodiments are discussed herein with the understanding that the embodiments described in the present disclosure are to be considered only exemplifications of the principles described herein, and the disclosure is not intended to be limited to the embodiments illustrated. Further, throughout the disclosure, the terms "about", "substantially", and "approximately" mean plus or minus 5% of the number or geometric constraint that each term precedes. For example, about 100 may mean 100+/5. Additionally, or alternatively, substantially orthogonal may mean that any 90 degree angle related to the described orthogonality may be between 85.5 degrees and 94.5 degrees (inclusive).

As mentioned above, planetary gear systems may be used in a variety of contexts. In some examples, a planetary gear system may be used in vehicle transmissions, such as to offer multiple gear ratios, reverse capabilities, and/or efficient torque distribution. A planetary gear system includes a sun gear, a plurality of pinion gears supported by a carrier, and a ring gear. The plurality of pinion gears in a simple planetary gearset are intermeshed with the sun gear and the ring gear. The plurality of pinion gears may generate friction when engaged with the sun gear and the ring gear, thereby generating heat and which based on an amount may negatively affect a lifetime of the planetary gear system. Transmission systems often include a plurality of planetary gearsets having various ones of the respective sun gears, planet carriers, and ring gears interconnected either fixedly or selectively through a plurality of clutches and/or brakes. An exemplary planetary transmission is described in U.S. Pat. No. 10,808,807, titled MULTI-SPEED PLANETARY TRANSMISSION, the entire disclosure of which is expressly incorporated by reference herein.

Accordingly, there exists a need to reduce the amount of heat generated due to the intermeshing of the gears, such as the sun gear when it engages with the pinion gears. In embodiments, the amount of heat generated may be reduced by lubricating the sun gear with a lubrication fluid, such as transmission oil. The term "oil" used throughout the remainder of the specification should be interpreted to include any type of fluid which may be used to lubricate components. In examples, the lubrication of the sun gear may be indirect. For example, a lubrication fluid may be provided through passageways in the carrier and directed at the pinion gears which in turn lubricate the sun gear as the pinion gears rotate due to the intermeshing with the sun gear. It is with respect to these and other general considerations that embodiments have been described. Also, although relatively specific problems have been discussed, it should be understood that the embodiments should not be limited to solving the specific problems identified herein.

Aspects of the present disclosure may be advantageous to address the above problems, as well as additional problems that may be recognized by those of ordinary skill in the art. Generally, as explained herein, a planetary gear system includes a sun gear, a plurality of pinion gears supported by a carrier, and a ring gear. The plurality of pinion gears in a simple planetary gearset are intermeshed with the sun gear and the ring gear. The carrier provided herein may include a plurality of spaced apart side walls and a plurality of circumferentially spaced apart posts that interconnect the side walls. At least one of the posts may include an oil delivery channel and an oil exit channel in fluid communication with one another. The oil exit channel may be pointed at a pinion gear, such that when oil is supplied to the carrier, the oil is delivered through the oil exit channel and onto the pinion gear. Accordingly, when the portion of the pinion gear with the oil meshes with the sun gear, the sun gear is lubricated with the oil to lubricate the sun gear and reduce friction between the sun gear and the pinion gear. In embodiments, the pinion gear provides continuous oil lubrication of the sun gear. The planetary gear system provided herein, which provides continuous oil cooling of the sun gear, enables increased torque at higher speeds than conventional planetary gear systems.

Figure 1A:
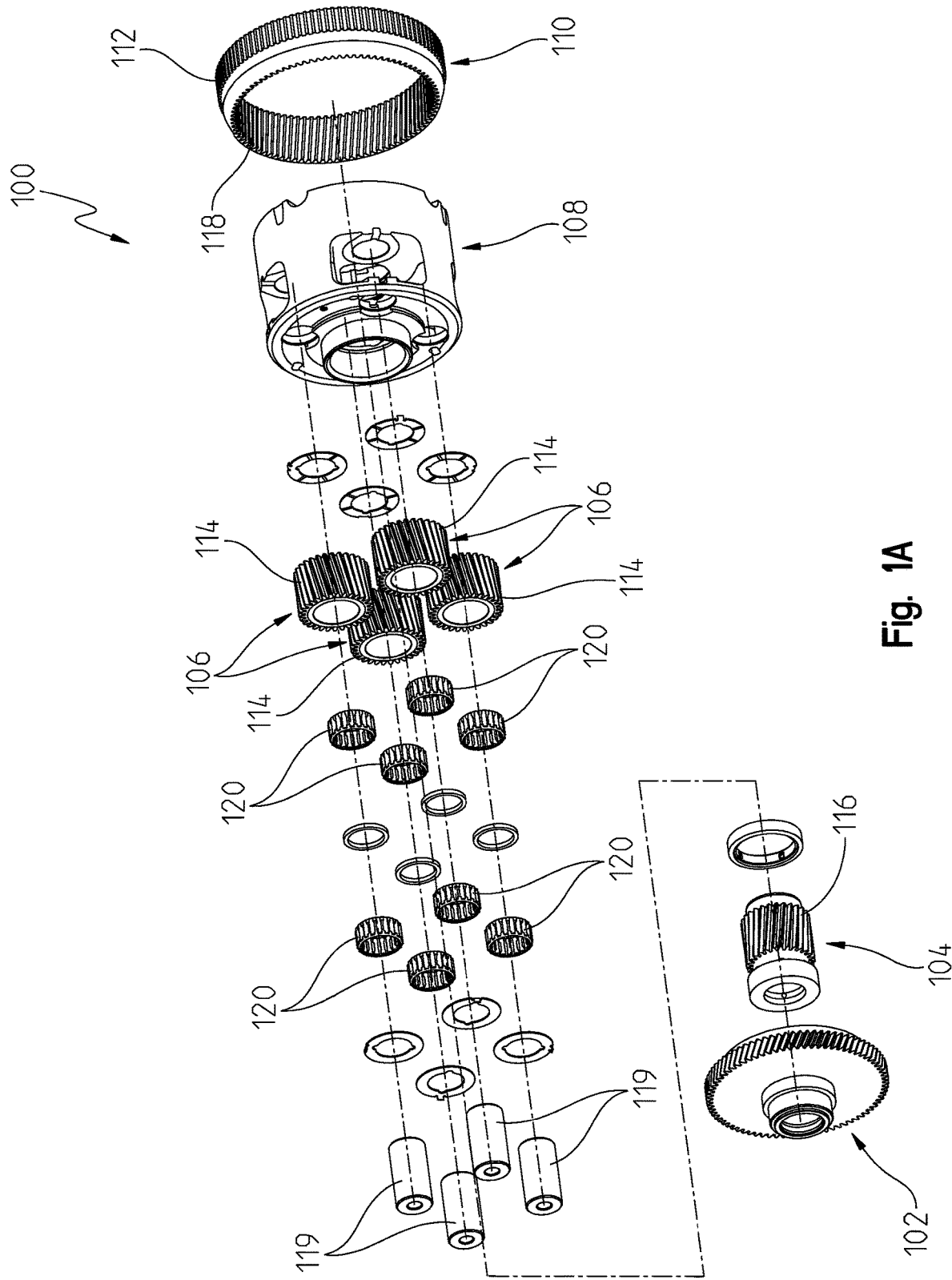
FIG. 1A illustrates an exploded view of the planetary gear system of FIG. 1, according to some aspects provided herein.

FIG. 1 illustrates an isometric view of a planetary gear system 100 and FIG. 1A illustrates an exploded view of the planetary gear system 100. An input 102 which is operatively coupled to a sun gear 104 of planetary gear system 100 through a shaft 103 (see FIG. 3). Input 102, in embodiments, is fixedly coupled to sun gear 104 so that input 102 and sun gear 104 rotate together. Alternatively, input 102 may be operatively coupled to sun gear 104 through one or more intermediate rotatable components. Sun gear 104 intermeshes with a plurality of pinion gears 106 which are carried by a carrier 108. The plurality of pinion gears 106 further intermesh with a ring gear 110. Ring gear 110 is illustratively shown with splines 112 which may be received in corresponding splines of a transmission housing (not shown) to hold ring gear 110 stationary relative to the transmission housing. Thus, a rotation of input 102 causes a corresponding rotation of sun gear 104 which in turn causes a rotation of carrier 108 through the intermeshing of teeth 116 of sun gear 104 with teeth 114 of pinion gears 106 and the intermeshing of teeth 114 of pinion gears 106 with teeth 118 of ring gear 110. Thus, in the illustrated example, carrier 108 is considered the output of planetary gear system 100. In other embodiments, input 102 may be coupled to carrier 108 and sun gear 104 is the output of planetary gear system 100. Other arrangements are possible.

Figure 2:
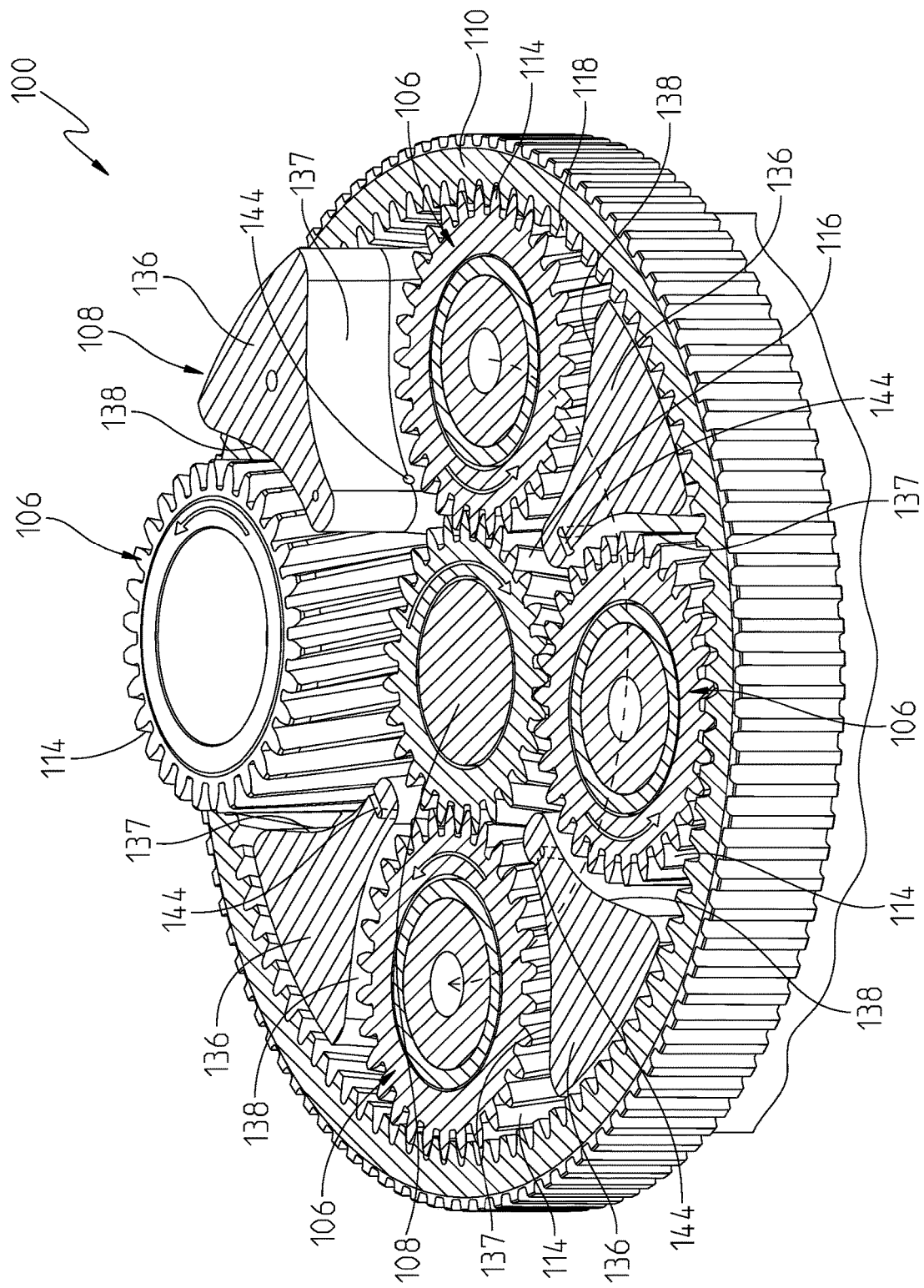
FIG. 2 illustrates a cross-sectional view of the planetary gear system of FIG. 1 with stepped sections, according to some aspects provided herein.

FIG. 2 illustrates a cross-sectional view of the planetary gear system 100 of FIG. 1 with stepped sections, according to some aspects provided herein. The planetary gear system 100 includes the sun gear 104 (see FIG. 2) disposed within the carrier 108, and surrounded by a plurality of pinion gears 106.

Each pinion gear 106 is rotatable on a shaft 119 (see FIG. 1A) that is fixedly coupled to carrier 108. Bearings 120 are interposed between the respective shaft 119 and pinion gear 106. The plurality of pinion gears 106 are operably coupled to the sun gear 104. For example, the plurality of pinion gears 106 may rotate in a rotational direction (e.g., clockwise or counter-clockwise) that is opposite to the rotational direction of the sun gear 104. The sun gear 104 is configured to rotate about an axis A. In some examples, the carrier 108 is rotationally symmetric about the axis A. In some examples, the sun gear 104 is located at a center of the carrier 108, such that the axis A extends through a geometric center point and/or center of mass of the sun gear 104. Further, the plurality of pinion gears 106 may be diametrically symmetric about the axis A. For example, the plurality of pinion gears 106 may include four pinion gears (as shown in FIG. 2), which are equally spaced about the axis A. In some examples, the plurality of pinion gears 106 includes two pinion gears, or three pinion gears, or six pinion gears, any other multitude of pinion gears that are spaced apart about the axis A.

The sun gear 104 includes a plurality of teeth 116. Further, the plurality of pinion gears 106 each include a respective plurality of teeth 114. The teeth 116 of the sun gear 104 are sized and shaped to engage with the teeth 114 of the pinion gears 106, such that as one of the sun gear 104 or the plurality of pinion gears 106 are rotated, the other one of the sun gear 104 or the plurality of pinion gears 106 are rotated as well.

In some examples, each of the plurality of pinion gears 106 are the same size (e.g., have the same diameter). In some examples, one or more pinion gears of the plurality of pinion gears 106 have a size (e.g., diameter) that is different than one or more other pinion gears of the plurality of pinion gears 106. In some examples, at least one of the plurality of pinion gears 106 has a diameter (e.g., measured from an outermost point of the teeth 114 and/or an innermost point of the teeth 114) that is larger than a diameter of the sun gear 104 (e.g., similarly measured from an outermost point of the teeth 116 and/or an innermost point of the teeth 116). Additionally, and/or alternatively, in some examples, at least one of the plurality of pinion gears 106 has a diameter (e.g., measured from an outermost point of the teeth 114 and/or an innermost point of the teeth 114) that is smaller than a diameter of the sun gear 104 (e.g., similarly measured from an outermost point of the teeth 116 and/or an innermost point of the teeth 116). In such examples, planetary gear system 100 may have multiple ring gears 110 with a first portion of the plurality of pinion gears 106 having a first diameter being intermeshed with a first ring gear and a second portion of the plurality of pinion gears 106 having a second diameter being intermeshed with a second ring gear.

The planetary gear system 100 further includes a ring gear 110. The ring gear 110 may encircle the plurality of pinion gears 106, such as illustrated. Therefore, the ring gear 110 may also encircle the sun gear 104. The ring gear 110 may be rotationally symmetric about the axis A. Further, the ring gear 110 may be operably coupled to the plurality of pinion gears 106, such that the ring gear 110 meshes with the plurality of pinion gears 106. For example, the ring gear 110 may include a plurality of teeth 118 that engage with the teeth 114 of the plurality of pinion gears 106. As mentioned herein, ring gear 110 includes a plurality of splines 112 which, for example, may fixedly couple ring gear 110 to a stationary component, such as a housing. In embodiments, splines 112 may be coupled to another rotational component, such as one of a sun gear, a planet carrier, or a ring gear of another planetary gear system. Accordingly, the ring gear 110 may be configured to rotate based on the a rotation of one or more of the plurality of pinion gears 106. Additionally, or alternatively, the plurality of pinion gears 106 may be configured to rotate based on a rotation of the ring gear 110 (e.g., depending on which component of the planetary gear system 100 is being driven).

Figure 4:
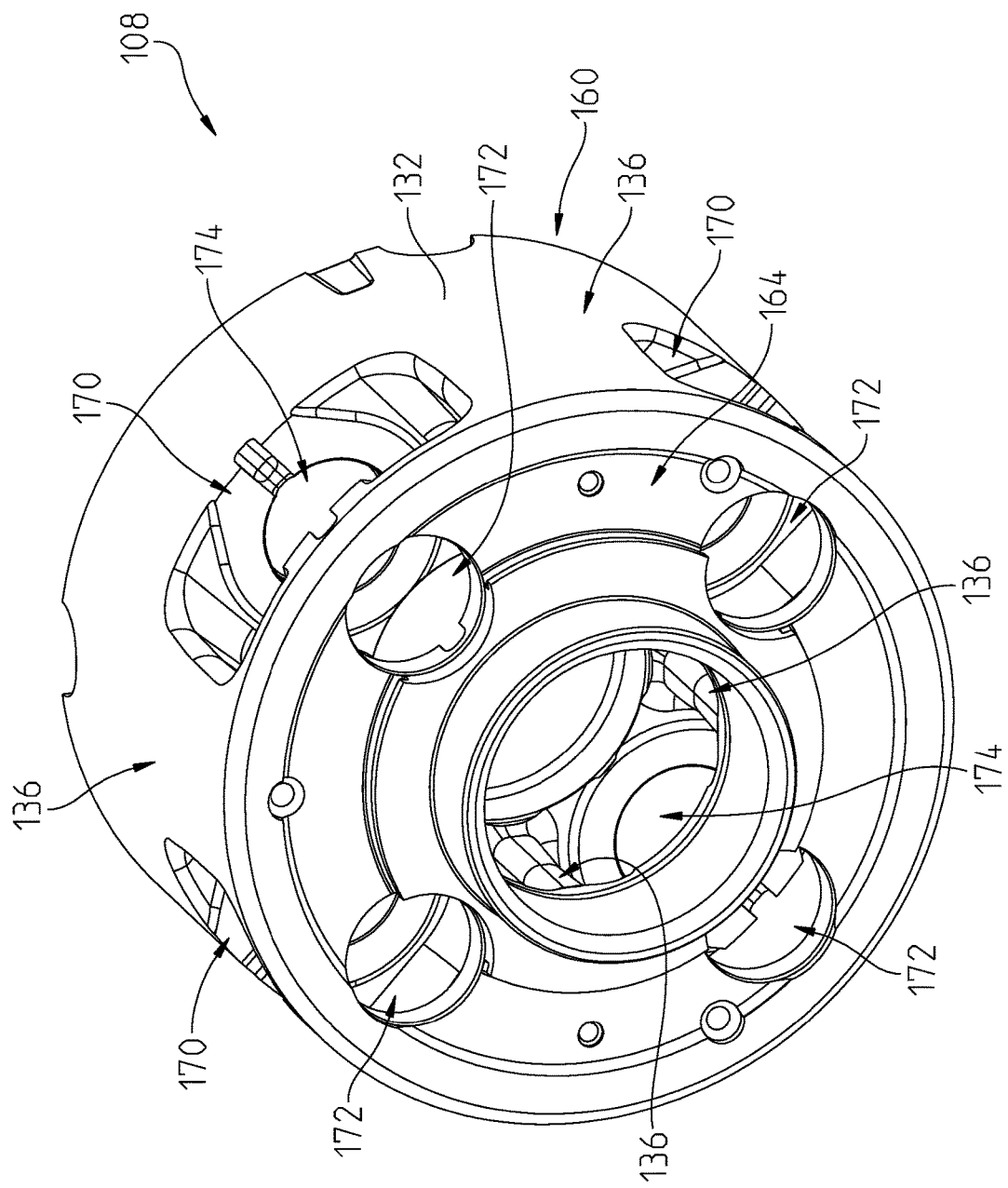
FIG. 4 illustrates a front perspective view of a carrier of the planetary gear system of FIG. 1, according to some aspects provided herein.
Figure 5:
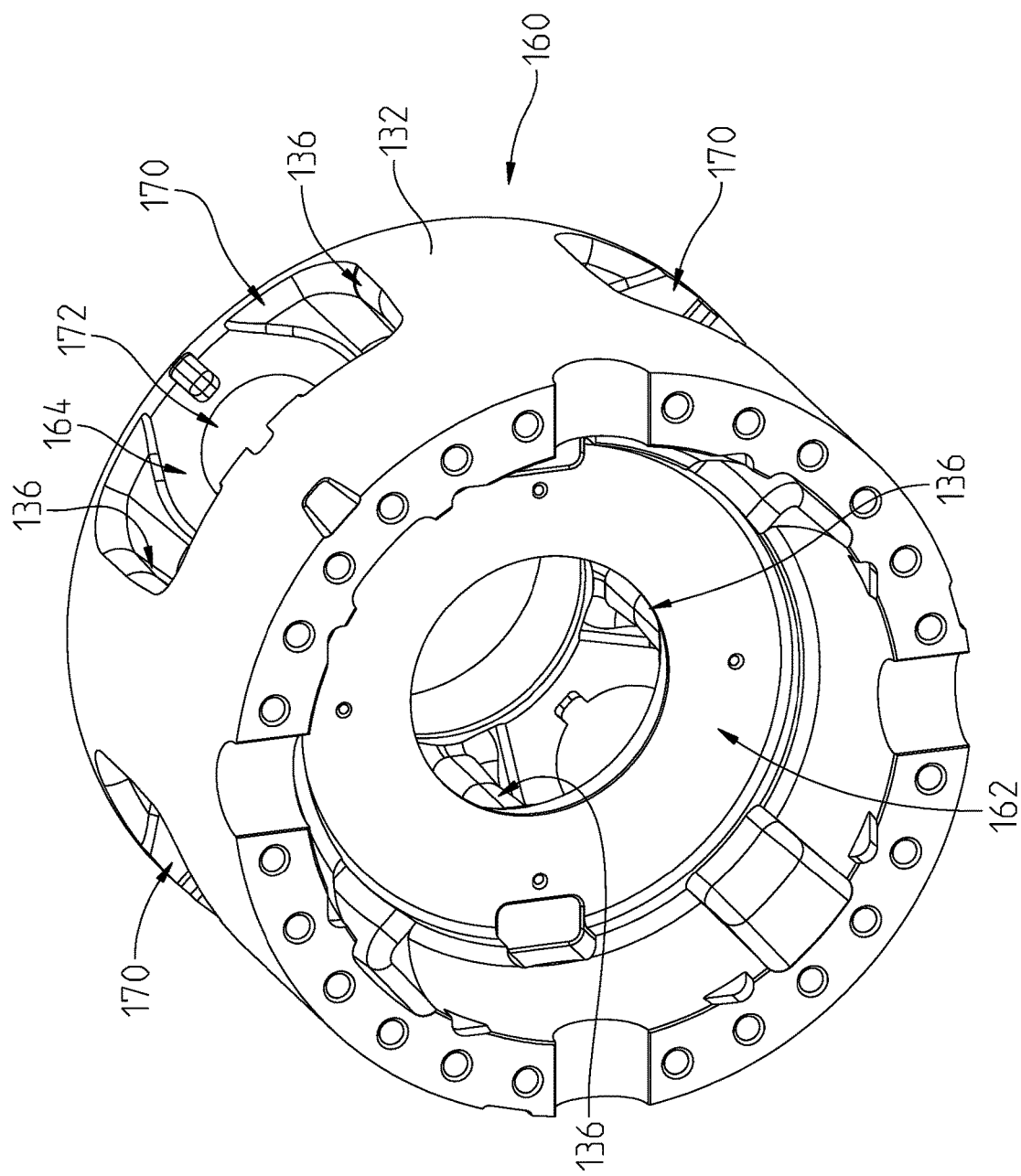
FIG. 5 illustrates a rear perspective view of the carrier of FIG. 4, according to some aspects provided herein.

Referring to FIGS. 4 and 5, carrier 108 includes a base 160 having a rear wall 162 and a front wall 164. A side wall 132 extends between the rear wall 162 and the front wall 164. Side wall 132 includes a plurality of circumferential recesses 170 each of which receives a respective pinion gear 106. Each of front wall 164 and rear wall 162 include apertures 172, 174, respectively, to support respective shafts 119 which in turn support respective pinion gears 106. Between respective circumferential recesses 170 and spanning from front wall 164 to rear wall 162 are a plurality of spaced apart posts 136. As shown, the plurality of posts 136 are circumferentially spaced apart, in that the plurality of posts 136 are positioned at regular intervals along the circumference of the carrier 108. Each pair of adjacent posts 136 may have a pinion gear of the plurality of pinion gears 106 disposed therebetween as shown in FIG. 2. Accordingly, there may be a same number of posts 136 as there are pinion gears 106.

In some examples, the side wall 132, the plurality of posts 136, the front wall 164, and the rear wall 162 are unitary with one another (e.g., they are not detachable or are inseparable from each other). For example, the carrier 108 may be a single piece that is cast. Namely, the carrier 108 may be manufactured by pouring a molten material into a mold and allowing it to solidify into the carrier 108. As another example, the carrier 108 may include multiple pieces that are bolted, brazed, welded, or otherwise coupled together. Cast metals possess several properties that make them suitable for a wide range of applications. Cast metals generally have good strength, allowing them to withstand heavy loads and forces. The strength of cast metal can be enhanced by alloying or heat treatment processes. Casting processes enable the production of complex shapes and intricate details. Cast metals are also durable and resistant to wear, corrosion, and other environmental factors. This makes cast metals suitable for applications that require long-lasting and reliable components. Further, cast metals, such as aluminum and copper alloys, have high thermal conductivity. This property allows for efficient heat transfer, making them suitable for applications involving heat dissipation or thermal management (e.g., of fluids in an automotive transmission).

Referring to FIG. 2, in some examples, the posts 136 include a first curved wall 137 and a second curved wall 138. The first curved wall 137 and the second curved wall 138 may be laterally opposed. At least a portion of the first curved wall 137 may be defined by a rate of curvature that generally matches a rate of curvature of an outer diameter of the pinion gears 106. Additionally, or alternatively, at least a portion of the second curved wall 138 may be defined by a rate of curvature that generally matches a rate of curvature of an outer diameter of the pinion gears 106. Accordingly, the first curved wall 137 and/or the second curved wall 138 may be sized and shaped to economically use space within the carrier 108.

In some examples, the posts 136 may each be symmetric about a plane passing through the center of the post and axis A. In some examples, the first curved wall 137 and/or the second curved wall 138 are concave, such that the first curved wall 137 and/or the second curved wall 138 bend generally inward. For example, the first curved wall 137 and/or the second curved wall 138 of a respective post 136 of the plurality of posts 136 may bend toward the plane that defines vertical symmetry of the respective post 136 (a plane passing through the center of the post and axis A).

Figure 3:
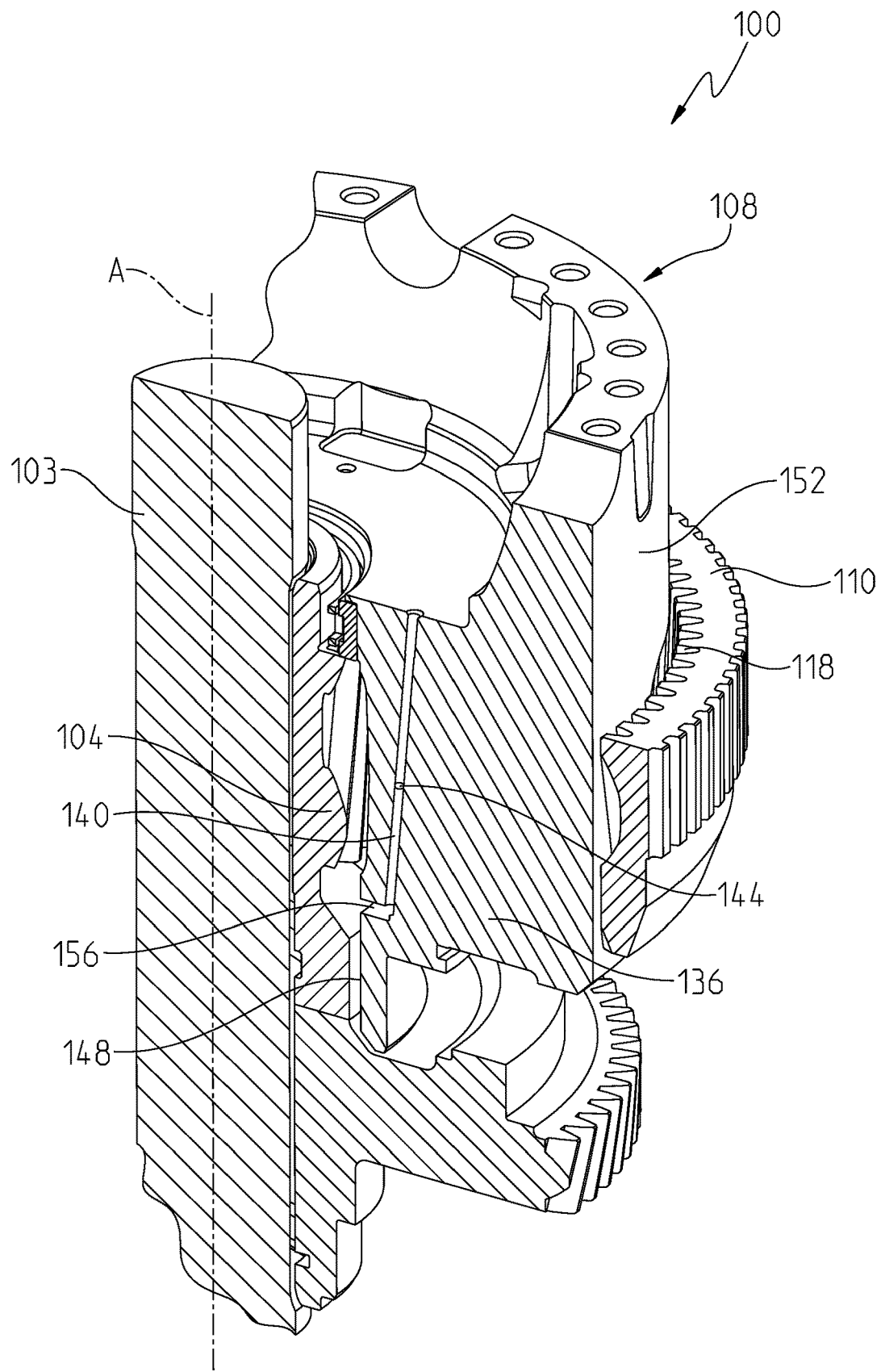
FIG. 3 illustrates a cross sectional view of the planetary gear system of FIG. 1, according to some aspects provided herein.

In some examples, at least one of the posts 136 includes an oil delivery channel 140 (see FIGS. 2 and 3) and an oil exit channel 144 (see FIGS. 2 and 3). The oil delivery channel 140 and the oil exit channel 144 may be in fluid communication with one another. Specifically, the oil delivery channel 140 and the oil exit channel 144 may together form a pathway through which fluid (e.g., oil) may flow, unrestricted. In some examples, each of the posts 136 includes a respective oil delivery channel and oil exit channel 144.

Each oil exit channel 144 may be pointed at a respective pinion gear of the plurality of pinion gears 106, such that when oil is supplied to the carrier 108 (e.g., via the oil delivery channel 140), the oil is delivered through the oil exit channels 144 and onto the pinion gears 106. Oil may be splashed onto the pinion gears 106 via the oil exit channels 144. Specifically, in embodiments, the oil exit channels 144 may be pointed at a central portion of the pinion gears 106 that is about halfway along an axial length of the pinion gears 106 (e.g., a length extending along the axis A).

In some examples, the oil may be delivered through the oil exit channels 144 onto a side of one or more pinion gears 106 that is immediately rotating into the sun gear 104. By applying the oil to the side of the one or more pinion gear 106 that is immediately rotating into the sun gear 104, the oil does not have to be carried about a majority of the one or more pinion gears 106 rotation (which may cause oil to be lost due to distance travelled, centrifugal force, etc.) before being applied to the sun gear 104. Accordingly, the oil may be efficiently carried from the oil exit channels 144 to the sun gear 104 (e.g., the teeth 116 of the sun gear 104) via the one or more pinion gears 106 (e.g., teeth 114 of the one or more pinion gears 106).

In embodiments, in a multi-speed transmission, the pinion gears 106 may rotate in different directions relative to oil exit channel 144 based on a gear setting of the transmission, such as in a first rotational direction towards the sun gear 104 for a forward gear setting wherein a vehicle incorporating the transmission is propelled forward and a second rotational direction away from the sun gear 104 for a reverse gear setting wherein the vehicle incorporating the transmission is propelled rearward. An advantage, among others, of having the oil exit channel 144 deliver oil onto the side of the pinion gear 106 advancing towards the sun gear 104 in a forward gear setting is that due to vehicles traveling the majority of their time in a forward direction the sun gear 104 is lubricated at a higher rate during a majority of the vehicle travel time.

To lube each and every one of the plurality of pinion gears 106, an oil delivery channel 140 may be pointed at each of the pinion gears 106, via a respective post of the plurality of posts 136. In some examples, an exit point of the oil exit channel 144 (e.g., a point at which oil is configured to exit the oil exit channel 144 of the carrier 108) directs oil to the teeth 114 of the pinion gear 106 on a side of the pinion gear 106 that is rotating toward the sun gear 104. Accordingly, the oil that is directed to the teeth 114 of the pinion gear 106 is then carried to the sun gear 104 to lubricate the sun gear 104.

FIG. 3 illustrates a cross sectional view of the planetary gear system 100 of FIGS. 1 and 2, according to some aspects provided herein. As shown in FIG. 3, the oil delivery channel 140 extends through the carrier 108 in a direction generally along the axis A. In some examples, oil may be carried up through the oil delivery channel 140 as a result of centrifugal force generated by a rotation of the aspects of the planetary gear system 100 (e.g., a rotation of the plurality of pinion gears 106 and/or the carrier 108).

In some examples including the illustrated example, the oil delivery channel 140 extends non-parallel to the axis A with a portion adjacent to and in fluid communication with oil exit channel 144 being further from axis A than a portion adjacent to and in fluid communication with groove 156. If the oil delivery channel 140 were parallel to the axis A, then the oil delivery channel 140 may need to be pressurized (e.g., via a conventional pressurization mechanism) such that oil could be carried therethrough. However, when the oil delivery channel 140 extends through the carrier 108 non-parallel to the axis A, then oil may be carried through the oil delivery channel 140 relying only on centrifugal force generated by the planetary gear system 100. In some examples, the oil delivery channel 140 may be pressurized to supplement centrifugal force. However, in other example, the oil delivery channel 140 may carry oil therethrough using only centrifugal force.

In some examples, the oil exit channel 144 extends substantially orthogonal through the post with respect to the oil delivery channel 140. In other words, the oil exit channel 144 may extend substantially parallel to a radial direction of the carrier 108 (e.g., wherein the radial direction is orthogonal to the axis A) to deliver oil to the teeth 114 of the pinion gears 106. For example, the oil exit channel 144 and/or the oil delivery channel 140 may define respective longitudinal axes (e.g., axes that extend from a first end to a second end of each of the respective channels 140, 144, while extending through a respective geometric center point of each of the channels 140, 144). The longitudinal axes may intersect each other at an angle that is about 90 degrees. Additionally, or alternatively, the oil exit channel 144 may extend from the oil delivery channel 140 (e.g., and through the post 136) at an angle that is between about 60 degrees and about 120 degrees, or between about 75 degrees and about 105 degrees, or between about 80 degrees and about 100 degrees.

In some examples, the carrier 108 includes an inner circumferential surface 148 (see FIG. 3) and an outer circumferential surface 152 of side wall 132 (see FIG. 3). The carrier 108 may include a groove 156 that extends through the inner circumferential surface 148. For example, the groove 156 may extend through the inner circumferential surface 148 and continuously about the axis A. The groove 156 may intersect the oil delivery channel 140. Accordingly, the groove 156 may be in fluid communication with the oil delivery channel 140, such that fluid may be supplied to the oil delivery channel 140 via the groove 156. In some examples, the groove 156 may collect oil therein as the carrier 108 rotates, as a result of centrifugal force generated by a rotation of the carrier 108.

While including a groove, such as the groove 156, provides one example of how to delivery oil into the oil delivery channel 140, additional and/or alternative oil delivery methods will be recognized by those of ordinary skill in the art. For example, oil may be provided directly to the oil delivery channel 140, such as via radial injection, an oil pump, and/or a nozzle. In some examples, one or more wicks (not shown) can be used to draw oil from a reservoir and deliver it to the oil delivery channel 140 through capillary action. As another example, the carrier 108 may include a dam (not shown) with a catcher plate that supplies oil to the oil delivery channel 140. Additional and/or alternative oil delivery methods will be recognized by those of ordinary skill in the art.

Figure 6:
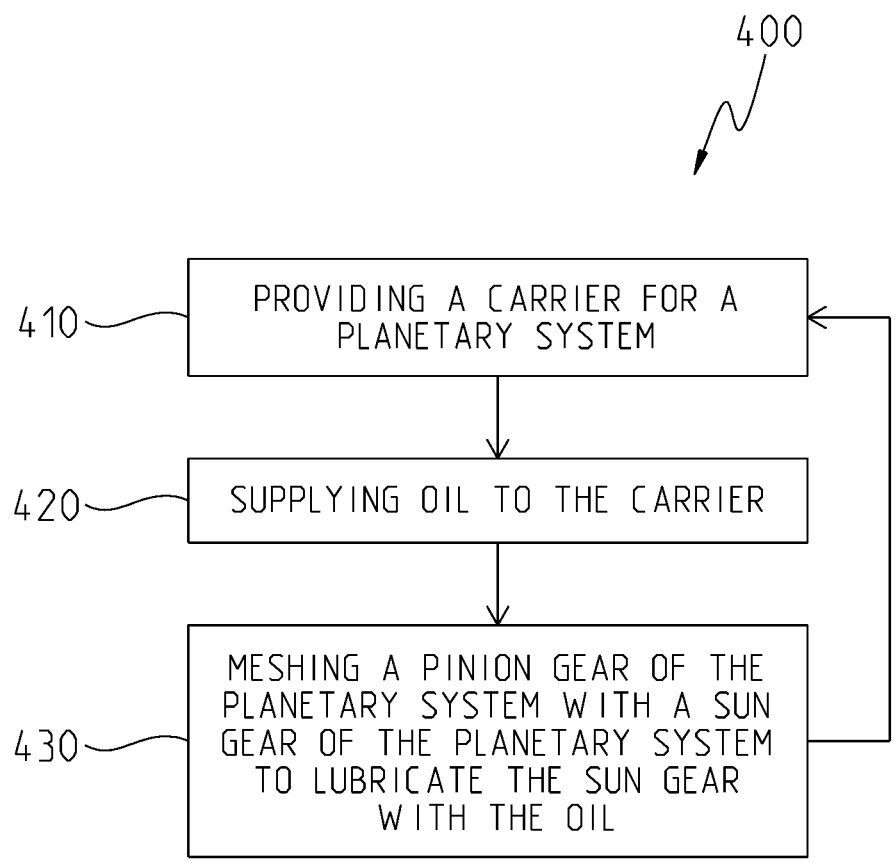
FIG. 6 illustrates an example method of lubricating a planetary gear system, according to some aspects provided herein.

FIG. 6 illustrates an example method 400 of lubricating a planetary gear system, according to some aspects provided herein. In some examples, the example method 400 is performed using the planetary system 100 described earlier herein with respect to FIGS. 1-5.

The method 400 begins at operation 410, wherein a carrier is provided. The carrier may be the same or similar as the carrier 108 discussed earlier herein with respect to FIGS. 1-5. For example, the carrier may include a plurality of circumferentially spaced apart posts. At least one of the posts may include an oil exit channel that is pointed at a pinion gear.

At operation 420, oil is supplied to the carrier, such that the oil is delivered through the oil exit channel onto the pinion gear. In some examples, the carrier further includes an oil delivery channel and the oil delivery channel is in fluid communication with the oil exit channel to deliver fluid (e.g., oil) thereto. For example, oil may be provided directly to the oil delivery channel to deliver oil to the oil exit channel. Additionally and/or alternative, oil may be supplied via radial injection, an oil pump, and/or a nozzle. In some examples, one or more wicks (not shown) can be used to draw oil from a reservoir and deliver it to the oil delivery channel and/or oil exit channel through capillary action. As another example, the carrier may include a dam (not shown) with a catcher plate that supplies oil to the oil delivery channel and/or the oil exit channel. Additional and/or alternative oil delivery methods will be recognized by those of ordinary skill in the art.

In some examples, the oil delivery channel is rotationally symmetric about an axis (e.g., axis A of FIG. 1). In some examples, the oil delivery channel extends through the carrier in a direction generally along the axis. Additionally and/or alternatively, in some examples, the oil is carried through the oil delivery channel by a rotation of the pinion gear. For example, centrifugal force may carry oil up the oil delivery channel (e.g., in addition to, or independent of, pressurization applied to the oil delivery channel).

At operation 430, the pinion gear meshes with a sun gear (e.g., the sun gear 104 of FIG. 2) to lubricate the sun gear with the oil. Generally, the oil may exit the oil exit channel onto a side of the pinion gear that is immediately rotating into the sun gear (e.g., as shown in FIG. 2). By applying the oil to the side of the pinion gear that is immediately rotating into the sun gear, the oil does not have to be carried about a majority of the pinion gear (which may cause oil to be lost due to distance travelled, centrifugal force, etc.) before being applied to the sun gear. Accordingly, the oil may be efficiently carried from the oil exit channel to the sun gear (e.g., teeth of the sun gear) via the pinion gear (e.g., teeth of the pinion gear).

Method 400 may terminate at operation 430. Alternatively, method 400 may return to operation 410 or 420 to create a continuous process for lubricating a planetary gear system.

Systems provided herein are advantageous for delivering lube oil directly onto the teeth 116 of the sun gear 104. Such a feat is difficult to accomplish because the sun gear 104 is located at the center of the planetary system 100, thereby making it difficult to reach. Further, centrifugal forces of the planetary gear system 100 are directed away from the teeth 116 of the sun gear 104, thereby making it difficult to direct lubrication to the sun gear 104. The planetary gear system 100 provided herein, which may provide continuous oil to the sun gear teeth, enables increased torque at higher speeds, as compared to conventional planetary systems. While some advantages of using the planetary system 100 include improved performance and increased product life, additional and/or alternative advantages will be recognized by those of ordinary skill in the art.

While this invention has been described as having exemplary designs, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A planetary system comprising:
   a sun gear rotatable about an axis;
   a plurality of pinion gears operably coupled to the sun gear, the plurality of pinion gears including a pinion gear, and each of the plurality of pinion gears being rotatable relative to the sun gear;
   a carrier supporting the plurality of pinion gears, the carrier comprising a front wall, a rear wall spaced apart from the front wall, and a plurality of posts circumferentially spaced apart between adjacent pinion gears of the plurality of pinion gears and interconnecting the front wall and the rear wall, wherein at least one of the posts comprises an oil delivery channel and an oil exit channel in fluid communication with one another, and wherein the oil exit channel is pointed at a portion of the pinion gear that is about halfway along an axial length of the pinion gear; and a ring gear operably coupled to the plurality of pinion gears, the plurality of pinion gears being rotatable relative to the ring gear, wherein the oil exit channel extends substantially orthogonal through the post with respect to the oil delivery channel at a portion of the oil delivery channel along which the oil delivery channels extends non-parallel to the axis.

2. The planetary system of claim 1, wherein each of the posts comprises a respective oil delivery channel and oil exit channel.

3. The planetary system of claim 1, wherein the oil delivery channel extends through the carrier in a direction generally along the axis.

4. The planetary system of claim 1, wherein the carrier comprises an inner circumferential surface and an outer circumferential surface, wherein the carrier comprises a circumferential groove that extends through the inner circumferential surface, and wherein the groove intersects the oil delivery channel.

5. The planetary system of claim 1, wherein the oil exit channel is pointed at a side of the pinion gear that is immediately rotating toward the sun gear.

6. A method of lubricating a planetary system, the method comprising:
   providing a carrier comprising a front wall, a rear wall spaced apart from the front wall, and a plurality of circumferentially spaced apart posts interconnecting the front wall and the rear wall, wherein at least one of the posts comprises an oil exit channel pointed at a pinion gear; and
   supplying oil to the carrier, such that the oil is delivered through the oil exit channel onto a side of the pinion gear that is immediately rotating into a sun gear; and
   meshing the pinion gear with the sun gear to lubricate the sun gear with the oil,
   wherein the oil is carried through the oil delivery channel by a rotation of the carrier.

7. The method of claim 6, wherein the plurality of posts, the front wall, and the rear wall are unitary with one another.

8. The method of claim 6, wherein the at least one of the posts further comprises an oil delivery channel in fluid communication with the oil exit channel, and wherein the supplying oil further comprises supplying oil through the oil delivery channel, into the oil exit channel, and onto the pinion gear.

9. The method of claim 8, wherein the carrier is rotationally symmetric about an axis, and wherein the oil delivery channel extends through the carrier in a direction generally along the axis.

10. The method of claim 9, wherein the oil delivery channel extends non-parallel to the axis.

11. The method of claim 9, wherein the oil exit channel extends substantially orthogonal through the post with respect to the oil delivery channel.

12. The method of claim 6, wherein the oil exit channel is pointed at a portion of the pinion gear that is about halfway along an axial length of the pinion gear.

13. A carrier for a planetary system, the carrier comprising:
   a plurality of spaced apart side walls; and
   a plurality of circumferentially spaced apart posts interconnecting the side walls,
   wherein the plurality of posts and side walls are a unitary casting,
   wherein at least one of the posts comprises an oil delivery channel and an oil exit channel in fluid communication with one another, and
   wherein the oil exit channel extends substantially orthogonal through the post with respect to the oil delivery channel at a portion of the oil delivery channel along which the oil delivery channels extends non-parallel to the axis.

14. The carrier of claim 13, wherein each of the posts comprises a respective oil delivery channel and oil exit channel.

15. The carrier of claim 13, wherein the carrier is rotationally symmetric about an axis, and wherein the oil delivery channel extends through the carrier in a direction generally along the axis.

* * * * *